Patented Oct. 12, 1948

2,450,936

UNITED STATES PATENT OFFICE 2,450,936

CONDITIONING OF DRILLING FLUIDS

William T. Cardwell, Jr., Whittier, Calif., assignor to California Research Corporation, San Francisco, Calif., a corporation of Delaware No Drawing. Application February 26, 1945, Serial No. 579,892

8 Claims. (Cl. 252—8.5)

This invention relates to drilling fluids, and more particularly to the conditioning of water-clay drilling muds employed in the drilling of wells.

One of the principal objects of the invention is to provide a method of conditioning a drilling fluid of this character to maintain its desired properties of viscosity, weight, gel strength and thixotropic character during recirculation in the drilling of a well.

Another object is to provide a method of conditioning drilling fluids to afford the desired viscosity reduction thereof and of maintaining the reduced viscosity at a reasonable value during subsequent recirculation, particularly at high temperatures.

Another object is to provide a more effective group of additive agents for drilling muds to control the initial reduction in viscosity, said agents also acting for a longer period of time than those heretofore used.

These and other objects of the invention will be further apparent from the following description and the appended claims.

Drilling fluids or muds are almost universally used in the drilling of wells employed for tapping underground collections of oil, gases, brines and water. These muds fulfill various functions, the most important of which are to assist in the removal of cuttings from the well, to seal off gas pockets which may be encountered at various levels, and to lubricate the drilling tools and the drill pipes which carry the tools.

Drilling muds are essentially mixtures of clay and water, usually so compounded that they weigh from eight to twelve pounds per gallon. Whenever it is found necessary to increase the specific gravity of a particular mud, it is customary to add thereto finely divided materials which have a high specific gravity, such as barytes, etc. Starch or the like is sometimes included but, under usual circumstances, clay and water generally form the bulk of the fluid.

An ideal drilling mud is one which is thixotropic, that is to say, a fluid which, on agitation by pumping or otherwise, has a relatively low viscosity and is free flowing but, when agitation is stopped, gradually sets or gels. This gelling action is sufficiently slow to permit the cuttings to settle two or three feet before the gel structure is strong enough to support them. It is customary to circulate a drilling mud down the hollow drill stem to the locus of drilling where the mud picks up the cuttings, and the mud with suspended cuttings then returns up the well through the annular channel between the drill stem and the well casing. The drilling mud with suspended cuttings is then generally flowed through screens to remove the coarser particles, and then is passed by a suitable flow passage or mud ditch to a settling pit, where the cuttings settle out, leaving a substantially cuttings-free drilling mud which is returned to the well.

Where a drilling mud of the required weight and gel strength has been found to have a higher viscosity than desired, it has been customary to add certain chemicals to the drilling mud in relatively small amounts to lower the viscosity thereof without undesirably affecting other properties of the mud. Various alkali metal silicates, phosphates, and particularly molecularly dehydrated phosphates such as sodium hexametaphosphate, or tetrasodium pyrophosphate, have been employed for this purpose. Alkaline chemicals generally serve to adjust the pH of the drilling fluid to the range of approximately 9.5 to 10.5 where it has been found that clay suspensions have a minimum of viscosity. Certain lyophile colloids, such as gallic acid, tannic acid, and the alkali metal salts thereof, have also been used to protect the suspended clay against flocculation; but such materials are generally ineffective to lower the viscosity of a clay suspension unless used in conjunction with a suitable alkaline viscosity-reducing reagent of the character of those specified above, the proportion of the latter being such as to give the higher pH value of the drilling fluid as previously specified.

It has been found that the various water-soluble salts of polyphosphoric acids do not permanently reduce the effective or apparent viscosity of drilling muds except for a short period immediately following their introduction. This invention broadly comprehends the introduction of water-soluble stannates, and particularly sodium and potassium stannate in amounts effective initially to reduce the viscosity of the drilling mud to a minimum value, either alone or in combination with the lyophile colloids, such as gallic acid, tannic acid, quebracho or the like.

The following tests illustrate the comparative effects of sodium stannate and sodium hexametaphosphate in the reduction of viscosity of a certain drilling fluid prepared from a California clay. The drilling fluid was mixed to a density of 84 pounds per cubic foot, after which it was subjected to 20 hours of storage at 170° F., then agitated violently for a period of 1 hour, after which it was again stored for 20 hours at the high temperature followed by a similar period of violent agitation. The sodium stannate was used in a concentration of 0.7 pound per barrel of mud fluid and the sodium hexametaphosphate was used in a concentration of 1.6 pound per barrel. These were the amounts necessary to lower the viscosity to a minimum value after which further additions caused the viscosity to rise.

TABLE I

*Effects of sodium stannate and sodium hexametaphosphate fluid*

| Fluid | Stormer Apparent Viscosity (Centipoises) | |
|---|---|---|
| | Before Aging | After Aging |
| Original Drilling Fluid | 28 | 79 |
| After treatment with Sodium Stannate | 10 | 42 |
| After treatment with Sodium Hexametaphosphate | 9 | 40 |

Somewhat improved results may be expected by the addition of a lyophile colloid, for example quebracho, to certain drilling fluids. The following table illustrates the effect of using quebracho in the proportion of 0.9 pound per barrel. It is apparent that in the presence of this lyophile colloid the resistance of the alkali metal stannate treated drilling mud to viscosity increase, due to agitation and high temperature, is greatly increased.

TABLE II

*Effects of sodium stannate and sodium hexametaphosphate, when used in conjunction with quebracho*

| Fluid | Stormer Apparent Viscosity (Centipoises) | |
|---|---|---|
| | Before Aging | After Aging |
| Original Drilling Fluid plus Quebracho | 30 | 62 |
| After treatment with Sodium Stannate | 9 | 14 |
| After treatment with Sodium Hexametaphosphate | 10 | 31 |

The comparative effect of sodium and potassium stannates with another of the water-soluble salts of polyphosphoric acids, specifically tetrasodium pyrophosphate, is shown in Table III below in which the chemical concentrations were: Quebracho 0.9 pound per barrel, sodium stannate 1.2 pound per barrel, potassium stannate 1.3 pound per barrel, and tetrasodium pyrophosphate 1.2 pound per barrel.

TABLE III

*Effects of sodium stannate, potassium stannate, and tetrasodium pyrophosphate, when used in conjunction with quebracho*

| Fluid | Stormer Apparent Viscosity (Centipoises) | |
|---|---|---|
| | Before Aging | After Aging |
| Original Drilling Fluid plus Quebracho | 37 | 89 |
| After treatment with Sodium Stannate | 13 | 19 |
| After treatment with Potassium Stannate | 16 | 52 |
| After treatment with Tetrasodium Pyrophosphate | 11 | 37 |

The preceding data have involved the viscosities of drilling fluids as determined with the Stormer Viscometer. These viscosities determine how the drilling fluid will flow at high rates in the drilling fluid circulating system, for instance, in the drill pipe, where the fluid is in violent turbulent motion. Another important phase of drilling fluid viscous behavior occurs at low shearing rates, when the fluid is quiescent, or almost quiescent.

When allowed to remain quiescent, a good drilling fluid gels; and this property enables it to suspend the drill cuttings, which would otherwise settle back to the bottom of the hole. It is not desirable however that the gel strength be too high, for this will retard logging instruments that are lowered into the hole, and necessitate high pressures to resume circulation. It will also cause gas from high pressure gas formations to be drawn into the hole when the drill pipe is removed, thus creating the danger of a blow out (see G. E. Cannon, American Petroleum Institute Drilling and Production Practice, 1934, pp. 42-47).

It is desirable that the gel strength be no higher than necessary to suspend the required cuttings.

Treatment with sodium stannate and quebracho has a marked advantage over currently used treatments in that the drilling fluid has a much lower gel strength after aging.

Table IV shows the results of experiments in which fluids were aged for 6 days at 160° F. in simulation of the aging they receive in a bore hole. In them, the drilling fluid was an 11% bentonite suspension and the quebracho, sodium stannate, potassium stannate and tetrasodium pyrophosphate were each used in a concentration of 0.16 pound per barrel.

TABLE IV

*Effects of sodium stannate, potassium stannate, and tetrasodium pyrophosphate, when used in conjunction with quebracho*

| Fluid | Gel Strengths (grams on the Stormer Viscometer, Standard A. P. I. Method) | |
|---|---|---|
| | Before Aging | After Aging |
| Original drilling fluid plus Quebracho | 190 | 500 |
| After treatment with Sodium Stannate | 5 | 10 |
| After treatment with Potassium Stannate | 10 | 290 |
| After treatment with Tetrasodium Pyrophosphate | 5 | 270 |

It is apparent that the sodium stannate treatment is more satisfactory for maintaining low gel strengths than the tetrasodium pyrophosphate treatment.

In conclusion, it will be noted that a new and improved additive agent for controlling the initial and continued viscosity, as well as gel strength of clay-water drilling fluids, has been disclosed. Although specific proportions of materials have been given above, it is obvious that, for different types of colloidal suspending agents and different compositions of water for making up the mud, variations will be found in the most effective amounts of these additive agents. Accordingly, it is understood that, in the case of alkali metal stannates for example, the range of proportions may vary from an effective amount up to about 1.5 or even 2 pounds per 42 gallon barrel of mud fluid, which may be made from clay or other colloidal material, for example starch or the like. Obviously all those modifications and variations in proportions as may be required to meet specific circumstances may be made without departing from this invention and such changes as are included within the scope of the appended claims are embraced thereby.

I claim:

1. The method of conditioning a mud-laden drilling fluid comprising an aqueous colloidal dispersion, to control the viscosity and other properties thereof during the circulation of the fluid for well drilling through clay and shale which tend to deflocculate and accumulate in the fluid stream, thereby to objectionably increase the viscosity thereof, which comprises treating the fluid with an alkali metal stannate in a proportion to give an initial viscosity reduction.

2. The method according to claim 1 with the added step of treating the fluid with a lyophile colloid.

3. An aqueous mud-laden drilling fluid containing an effective amount, up to about 2 pounds per 42 gallons of fluid, of an alkali metal stannate substantially to reduce viscosity and to maintain reduced viscosity at temperatures encountered in well drilling.

4. An aqueous mud-laden drilling fluid containing an effective amount, up to about 2 pounds per 42 gallons of fluid, of an alkali metal stannate and a lyophile colloid substantially to reduce viscosity and to maintain reduced viscosity at temperatures encountered in well drilling.

5. An aqueous mud-laden drilling fluid containing an effective amount, up to about 2 pounds per 42 gallons of fluid, of sodium stannate substantially to reduce viscosity and to maintain reduced viscosity at temperatures encountered in well drilling.

6. An aqueous mud-laden drilling fluid containing an effective amount, up to about 2 pounds per 42 gallons of fluid, of potassium stannate substantially to reduce viscosity and to maintain reduced viscosity at temperatures encountered in well drilling.

7. An aqueous mud-laden drilling fluid containing an effective amount, up to about 2 pounds per 42 gallons of fluid, of sodium stannate and a lyophile colloid substantially to reduce viscosity and to maintain reduced viscosity and gel strength values at temperatures encountered in well drilling.

8. An aqueous mud-laden drilling fluid containing from about 0.5 to about 1.5 pounds per 42 gallons of fluid of sodium stannate and about 0.5 to 1.5 pounds per 42 gallons of fluid of quebracho substantially to reduce viscosity and to maintain reduced viscosity and gel strength values at temperatures encountered in well drilling.

WILLIAM T. CARDWELL, Jr.

REFERENCES CITED

The following references are of record in the file of this patent:

UNITED STATES PATENTS

| Number | Name | Date |
| --- | --- | --- |
| 2,211,688 | Byck | Aug. 13, 1940 |
| 2,257,280 | Scholz | Sept. 30, 1941 |
| 2,294,877 | Wayne | Sept. 1, 1942 |
| 2,336,595 | Cannon | Dec. 14, 1943 |
| 2,343,113 | Jones | Feb. 29, 1944 |
| 2,369,407 | Robinson | Feb. 13, 1945 |

OTHER REFERENCES

Chemical Treatment of Rotary Drilling Fluids by Lawton et al. on pages 365–375 in "Articles in Physics," May 1932.

Disclaimer 2,450,936.—*William T. Cardwell, Jr.*, Whittier, Calif. CONDITIONING OF DRILLING FLUIDS. Patent dated Oct. 12, 1948. Disclaimer filed Sept. 11, 1950, by the assignee, *California Research Corporation*.

Hereby enters this disclaimer to claims 1, 2, 3, 4, 5, and 7 of said patent.

[*Official Gazette October 10, 1950.*]